United States Patent
Lee et al.

(10) Patent No.: US 9,904,752 B2
(45) Date of Patent: Feb. 27, 2018

(54) METHODS FOR DISTRIBUTING POWER IN LAYOUT OF IC

(71) Applicant: MediaTek Inc., Hsin-Chu (TW)

(72) Inventors: Zwei-Mei Lee, Taoyuan (TW); Bo-Jr Huang, Hsinchu (TW); Chi-Jih Shih, New Taipei (TW); Jia-Wei Fang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 140 days.

(21) Appl. No.: 14/986,275

(22) Filed: Dec. 31, 2015

(65) Prior Publication Data

US 2016/0217243 A1    Jul. 28, 2016

Related U.S. Application Data

(60) Provisional application No. 62/188,495, filed on Jul. 3, 2015, provisional application No. 62/108,629, filed on Jan. 28, 2015.

(51) Int. Cl.
G06F 17/50     (2006.01)

(52) U.S. Cl.
CPC ........ *G06F 17/5072* (2013.01); *G06F 17/505* (2013.01); *G06F 17/5009* (2013.01); *G06F 2217/78* (2013.01)

(58) Field of Classification Search
USPC ........................................................ 716/120
See application file for complete search history.

(56) References Cited

U.S. PATENT DOCUMENTS

| 7,760,011 | B2 | 7/2010 | Wang et al. | |
|---|---|---|---|---|
| 2008/0067995 | A1* | 3/2008 | Chua-Eoan | H02M 3/158 323/284 |
| 2014/0070879 | A1* | 3/2014 | Kawasaki | G06F 1/3203 327/543 |

OTHER PUBLICATIONS

Zeng, Z., et al.; "IC Power Delivery: Voltage Regulation and Conversion, System-Level Cooptimization and Technology Implications;" ACM Transactions on Design Automation of Electronic Systems; vol. 18; No. 2; Article 29; Mar. 2013; pp. 29:1-29:21.
Lau, S.K., et al.; "A Low-Dropout Regulator for SoC with Q-Reduction;" IEEE Journal of Solid-State Circuits; vol. 42; No. 3; Mar. 2007; pp. 658-664.
Lee, D.H., et al.; "Design of Multiple Power Domains Based on Ground Separation Technique for Low-Noise and Small-Size Module;" IEEE; 2012; pp. 805-808.

(Continued)

*Primary Examiner* — Bryce Aisaka
(74) *Attorney, Agent, or Firm* — McClure, Qualey & Rodack, LLP

(57) ABSTRACT

A method for distributing power in the layout of an integrated circuit is provided. The integrated circuit includes at least one macro block. A first physical layout of the macro block is obtained, wherein the macro block includes a plurality of standard cells. The first physical layout is divided into a plurality of partitions according to an IR simulation result of the first physical layout. A plurality of power isolation cells are inserted between the partitions. A second physical layout is obtained according to the partitions and the power isolation cells. A macro placement of the macro block is obtained according to the second physical layout. Each of the partitions further includes a low drop out (LDO) regulator.

24 Claims, 8 Drawing Sheets

(56) References Cited

OTHER PUBLICATIONS

Goran, P.; "A Methodology for Designing Low Power Sensor Node Hardware Systems;" Thesis; Dec. 2014; pp. 1-172.
Kanno, Y., et al.; "Hierarchical Power Distribution with 20 Power Domains in 90-nm Low-Power Multi-CPU Processor," ISSCC 2006; Session 29; Power Management and Distribution; pp. 1-10.
Hattori, T., et al.; "A Power Management Scheme Controlling 20 Power Domains for a Single-Chip Mobile Processor," ISSCC 2006; Session 29; Power Management and Distribution; pp. 1-10.

* cited by examiner

METHODS FOR DISTRIBUTING POWER IN LAYOUT OF IC

CROSS REFERENCE TO RELATED APPLICATIONS

This Application claims priority of U.S. Provisional Application No. 62/108,629, filed on Jan. 28, 2015, and U.S. Provisional Application No. 62/188,495, filed on Jul. 3, 2015, the entireties of which are incorporated by reference herein.

BACKGROUND OF THE INVENTION

Field of the Invention

The invention relates to a method for distributing power in the layout of an integrated circuit (IC), and more particularly, to a method for distributing power in the layout of an IC to manage power in macro blocks of the IC.

Description of the Related Art

In recent years, the developmental process of integrated circuits (ICs), such as very larger scale integrated circuit (VLSI) has generally utilized computer assisted design (CAD). According to a developmental process based on CAD, abstract circuit data, which corresponds to the functions of the integrated circuit to be developed, is defined by using a so-called hardware description language (HDL), and the defined circuit is used to form a concrete circuit structure to be mounted on a chip.

Before the IC chips are manufactured (or implemented), the floor plans and the layout areas of the IC chips are considered first so as to determine the die size of each IC chip. Furthermore, a power supply arrangement is also important in the placements and the floor plans of the IC chip. If the power supply arrangement is not appropriate, it will affect the normal operation of the IC chips after the IC chips are manufactured.

BRIEF SUMMARY OF THE INVENTION

Methods for distributing power in the layout of an integrated circuit and integrated circuits are provided. An embodiment of a method for distributing power in the layout of an integrated circuit is provided. The integrated circuit comprises at least one macro block. A first physical layout of the macro block is obtained, wherein the macro block comprises a plurality of standard cells. The first physical layout is divided into a plurality of partitions according to an IR simulation result of the first physical layout. A plurality of power isolation cells are inserted between the partitions. A second physical layout is obtained according to the partitions and the power isolation cells. A macro placement of the macro block is obtained according to the second physical layout. Each of the partitions further comprises a low drop out (LDO) regulator.

Furthermore, another embodiment is provided of a method for distributing power in the layout of an integrated circuit, wherein the integrated circuit comprises at least one macro block. The first physical layout of the macro block is obtained, wherein the macro block comprises a plurality of standard cells. The IR simulation result of the first physical layout is obtained. The first physical layout is divided into a plurality of partitions according to the IR simulation result. A plurality of low drop out (LDO) regulators are inserted into the respective partitions. The second physical layout is obtained according to the partitions and the LDO voltage regulators. The macro placement of the macro block is obtained according to the second physical layout. Each of the LDO voltage regulators provides an output voltage as a supply voltage of the standard cells of the corresponding partition, and the supply voltage of the standard cells of each of the partitions is independent.

Moreover, an embodiment of an integrated circuit is provided. The integrated circuit comprises at least one macro block comprising a plurality of standard cells formed in a physical layout. The physical layout is divided into a plurality of partitions according to an IR simulation result of the macro block. Each of the partitions further comprises a low drop out (LDO) regulator. Each of the LDO voltage regulators provides an output voltage as a supply voltage of the standard cells of the corresponding partition, and the output voltage of each of the LDO voltage regulators is independent.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
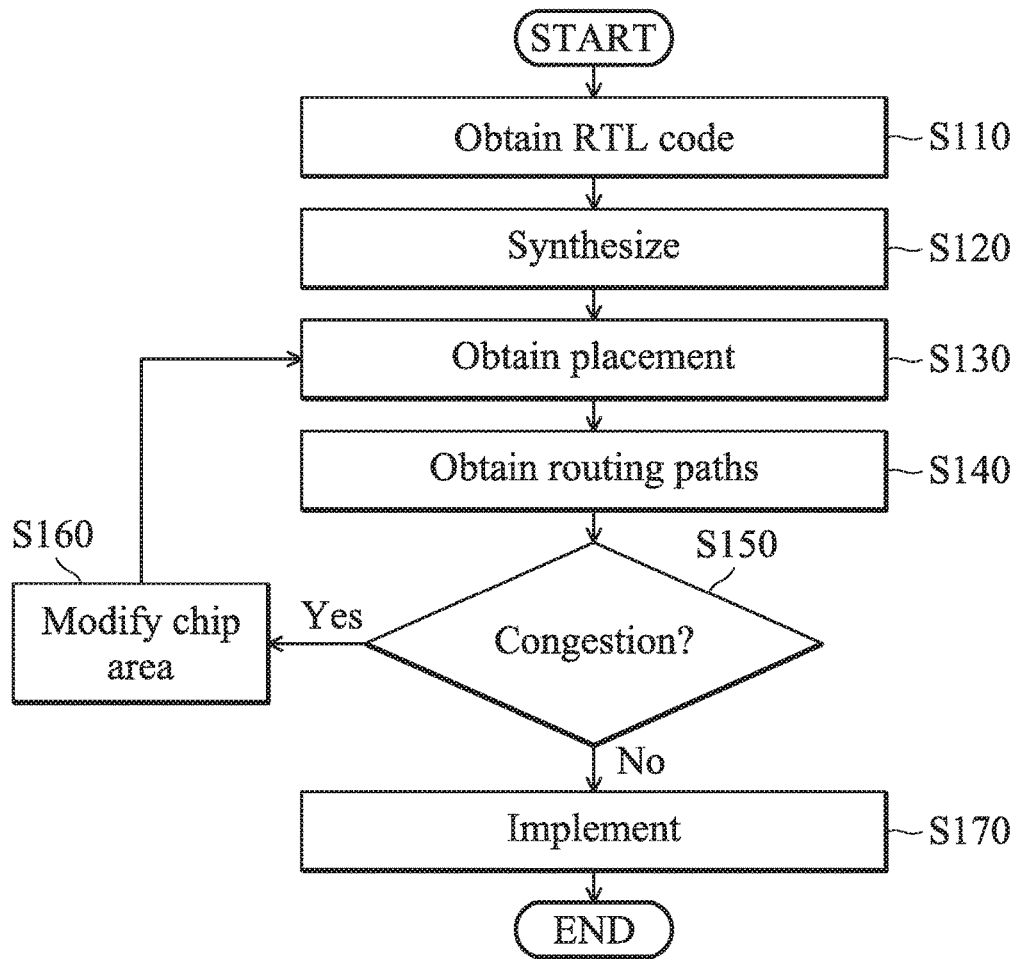
FIG. 1 shows a flow chart illustrating a typical hierarchical design process of an integrated circuit (IC)

FIG. 1 shows a flow chart illustrating a typical hierarchical design process of an integrated circuit (IC). First, in step S110, a register-transfer-level (RTL) code describing the function performed by the IC is obtained. Next, in step S120, the RTL code is synthesized to generate gates for the IC. In general, the IC comprises a plurality of macro blocks, and each macro block provides a significant function for the IC, such as a specific processor (e.g. an application processor, a video processor, an audio processor, or a controller), a memory (e.g. a SRAM module) and so on. Furthermore, each macro block has a corresponding RTL code, and then the RTL codes of each macro block are synthesized to generate the gates of the macro block. Next, in step S130, according to a plurality of macro placements of the macro blocks, a whole chip placement procedure is performed to generate a placement of the gates within a chip area of the IC. For example, assuming that the IC comprises N macro blocks, N macro placements of the N macro blocks will be previously generated according to the RTL codes of the macro blocks by performing the individual macro placement procedures. Thus, according to the N macro placements of the N macro blocks and the gates that do not belong to the N macro blocks, the whole chip placement procedure is performed and a whole chip placement is obtained. Next, the routing paths are obtained according to the whole chip placement (step S140), and then it is checked whether there is any congestion in the whole chip placement according to the routing paths (step S150). If there is no congestion, the IC is implemented according to the whole chip placement and routing paths (step S170). If there is congestion, the chip area of the IC must be modified to handle the congestion (step S160), and then the automatic place and route (APR) procedure is performed again (steps S130 and S140) so as to generate a new whole chip placement of the gates with the corresponding routing paths within the increased chip area of the IC.

Figure 2:
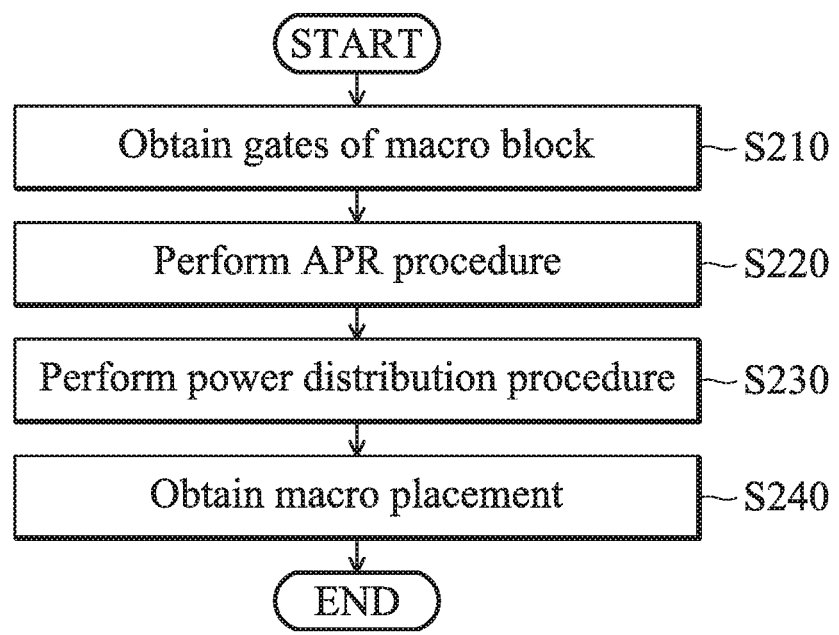
FIG. 2 shows a method for providing a macro placement of a macro block in an IC according to an embodiment of the invention, wherein the method of FIG. 2 is performed by a computer capable of operating an electronic design automation (EDA) tool.

FIG. 2 shows a method for providing a macro placement of a macro block in an IC according to an embodiment of the invention, wherein the method of FIG. 2 is performed by a computer capable of operating an electronic design automation (EDA) tool. First, in step S210, a processor of the computer obtains a plurality of gates of the macro block after RTL code of the macro block is synthesized. Next, in step S220, the processor performs an APR procedure on the gates of the macro block, to obtain an initial physical layout of the macro block. Next, in step S230, the processor performs a power distribution procedure on the initial physical layout of the macro block, so as to partition power domain of the initial physical layout and obtain a final physical layout with a flexible power management. For example, the initial physical layout comprises a single power group for providing a single power to supply the whole standard cells within the macro block, and the final physical layout comprises a plurality of power groups for providing various voltage signals to supply the standard cells of the macro block, so as to control power consumption of the macro block. Next, in step S240, the processor obtains the macro placement of the macro block according to the final physical layout. As described above, a whole chip APR is performed after obtaining the macro placements of the entire macro blocks of an IC, e.g. steps S130 and S140 of FIG. 1.

Figure 3:
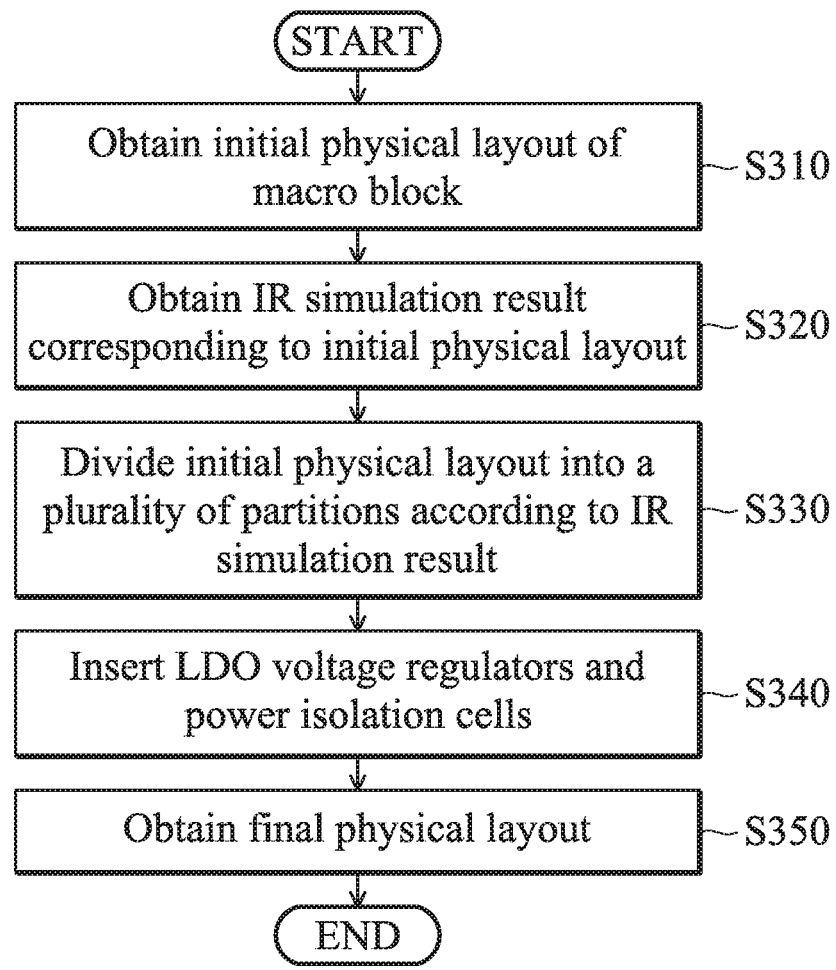
FIG. 3 shows a flowchart of the power distribution procedure of step S230 of FIG. 2 according to an embodiment of the invention.

FIG. 3 shows a flowchart of the power distribution procedure of step S230 of FIG. 2 according to an embodiment of the invention. First, in step S310, the processor obtains the initial physical layout of the macro block, wherein the supply voltages of the gates are assigned to a single voltage signal in the initial physical layout, i.e. the supply voltages of the gates are coupled together in the initial physical layout of the macro block. In the embodiment, the initial physical layout of the macro block comprises a plurality of standard cells corresponding to the gates of the macro block, and the standard cells comprise the logic gates (e.g. inverter, AND, OR gates), delay cells, flip flops and clock cells etc. Next, in step S320, the processor performs a gate-level power analysis on the initial physical layout according to the single voltage signal, and then obtains an IR simulation result corresponding to the initial physical layout. Next, in step S330, the processor divides the initial physical layout into a plurality of partitions according to the IR simulation result, wherein each partition corresponds to a power group. Next, in step S340, the processor inserts a plurality of low drop out (LDO) regulators into the partitions, respectively. For example, each power group comprises an inserted LDO voltage regulator, and the inserted LDO voltage regulator is capable of outputting a voltage signal as a supply voltage of the standard cells of the partition corresponding to the power group. Furthermore, in each power group, output properties (e.g. a voltage level, a driving current, etc.) of the voltage signal are determined according to the IR simulation result regarding the partition corresponding to the power group. Simultaneously, the processor inserts a plurality of power isolation cells between the partitions, so as to provide isolation between the different power groups. Specifically, the power groups are separated by the power isolation cells in the macro block. Next, in step S350, the processor obtains the final physical layout according to the partitions, the LDO voltage regulators, and the power isolation cells. In one embodiment, each LDO voltage regulator provides the voltage signal according to the same power signal, e.g. the single voltage signal of the single power group.

Figure 4:
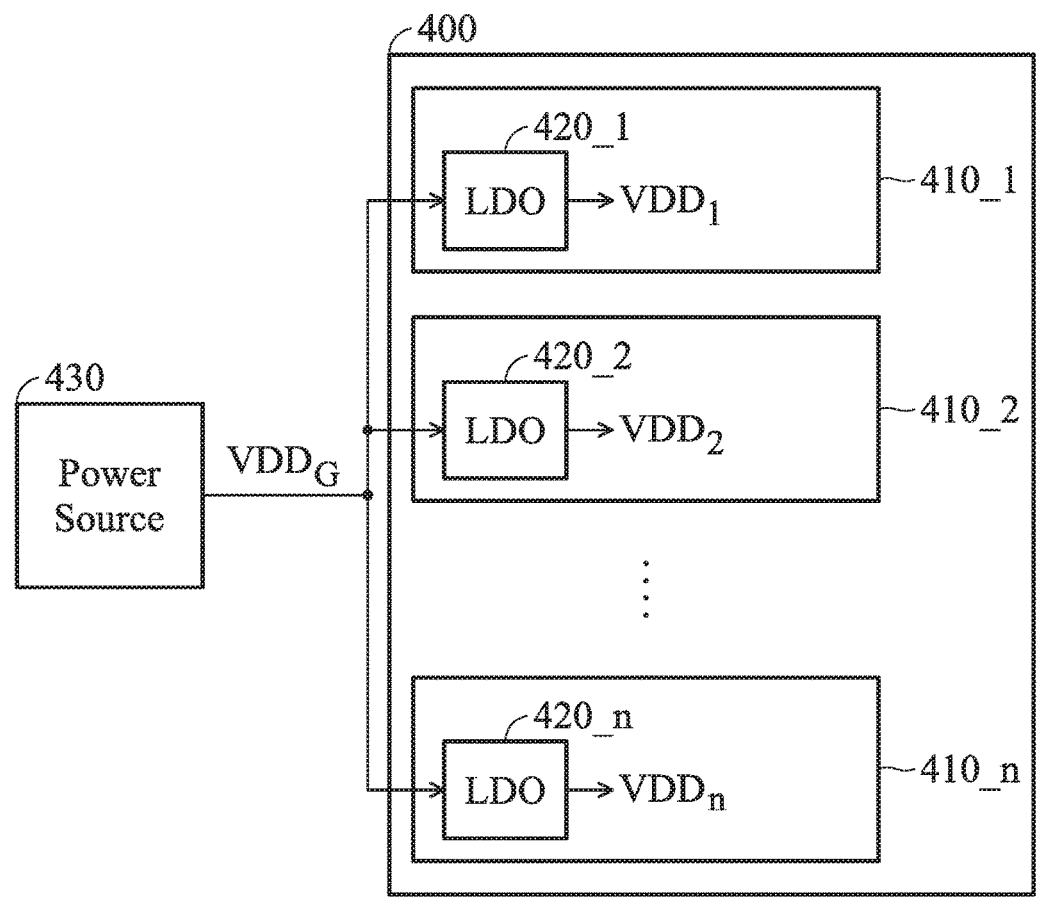
FIG. 4 shows an example illustrating power domains of a macro block 400 in the power distribution procedure of step S230 of FIG. 2 according to an embodiment of the invention.

FIG. 4 shows an example illustrating power domains of a macro block 400 in the power distribution procedure of step S230 of FIG. 2 according to an embodiment of the invention. After the power distribution procedure is performed, a plurality of power groups 410_1 to 410_n are formed in the macro block 400. As described above, each power group corresponds to an individual partition in a final physical layout of the macro block 400. Each of the power groups 410_1 to 410_n comprises a LDO voltage regulator, which is capable of providing a supply voltage according to a global voltage signal $VDD_G$ to the standard cells of the corresponding partition, and the global voltage signal $VDD_G$ is provided by a power source 430, such as a power management unit. For example, in the power group 410_1, a LDO voltage regulator 420_1 provides a voltage signal $VDD_1$ according to the global voltage signal $VDD_G$ and an IR simulation result regarding the partition corresponding to the power group 410_1, the LDO voltage regulator 420_2 provides a voltage signal $VDD_2$ according to the global voltage signal $VDD_G$ and an IR simulation result regarding the partition corresponding to the power group 410_2, and so on. It should be noted that the voltage signals $VDD_1$ to $VDD_n$ are independent from each other. In the embodiment, by inserting the LDO voltage regulators 420_1 to 410_n into the partitions of the macro block 400, the power consumption of the macro block 400 is decreased due to each partition of the macro block 400 being operated with the suitable supply voltage. Compared with a conventional macro block that uses a single power group (e.g. the global voltage signal $VDD_G$) to provide a single voltage as a supply voltage of the total standard cells in the conventional macro block, no additional power is wasted in the macro block 400.

Figure 5:
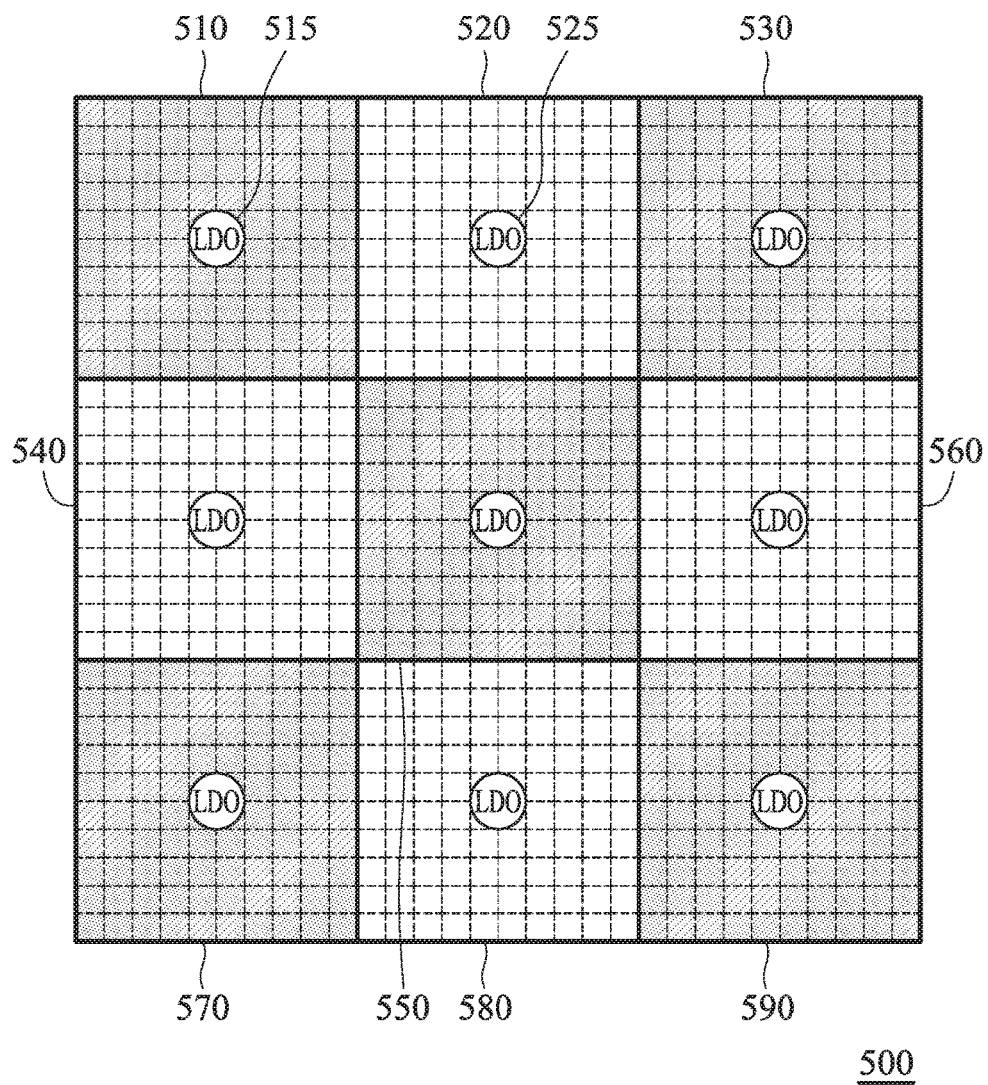
FIG. 5 shows an example illustrating a final physical layout of a macro block according to an embodiment of the invention.

FIG. 5 shows an example illustrating a final physical layout of a macro block 500 according to an embodiment of the invention. The macro block 500 comprises 9 partitions 510-590, and each of the partitions 510-590 comprises a LDO voltage regulator. For example, the partition 510 comprises a LDO voltage regulator 515, and the partition 520 comprises a LDO voltage regulator 525. As described above, each LDO voltage regulator is capable of providing an output voltage as a supply voltage of the standard cells within the corresponding partition. In the embodiment, the layout areas of the partitions 510-590 have the same shape, i.e. the macro block 500 has a regular power domain partition. In some embodiments, the quantities of the standard cells of the partitions 510-590 are equal. It should be noted that the layout area of the partition, the quantity of the standard cells within the partition, and the shape of the partition are determined according an IR simulation result of the macro block 500. As described above, the LDO voltage regulators of the final physical layout of the macro block 500 will be implemented in an integrated circuit (IC), so as to decrease power consumption of the macro block 500 in the IC.

Figure 6:
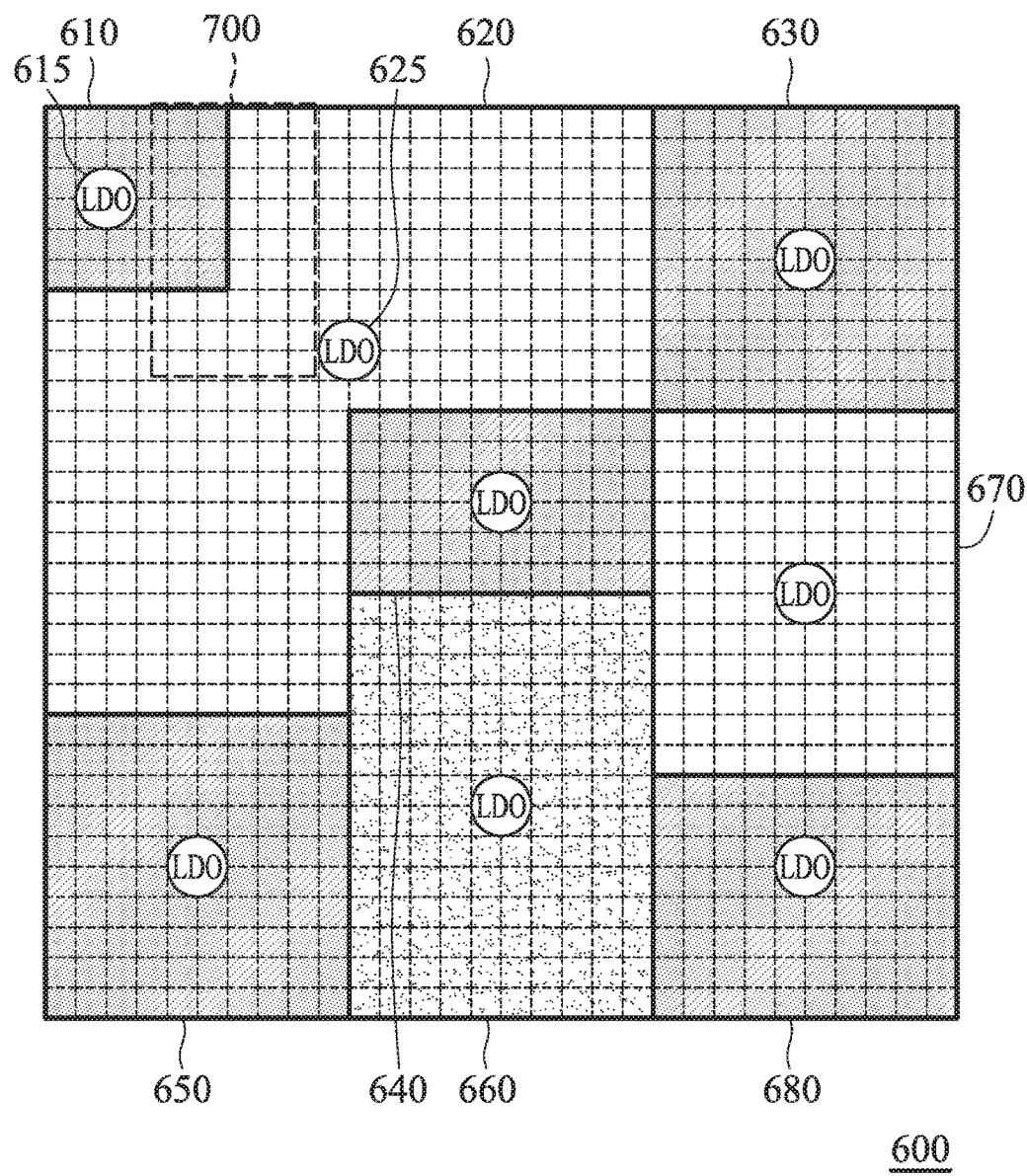
FIG. 6 shows an example illustrating a final physical layout of a macro block according to another embodiment of the invention.

FIG. 6 shows an example illustrating a final physical layout of a macro block 600 according to another embodiment of the invention. The macro block 600 comprises 8 partitions 610-680, and each of the partitions 610-680 comprises a LDO voltage regulator. As described above, each LDO voltage regulator is capable of providing an output voltage as a supply voltage of the standard cells within the corresponding partition. In the embodiment, layout areas of the partitions 610-680 have different shapes, i.e. the macro block 600 has a non-regular power domain partition. It should be noted that the layout area of the partition, the quantity of the standard cells within the partition, and the shape of the partition are determined according an IR simulation result of the macro block 600. Furthermore, the LDO voltage regulators of final physical layout of the macro block 600 will be implemented in an IC, so as to decrease power consumption of the macro block 600 in the IC.

Figure 7:
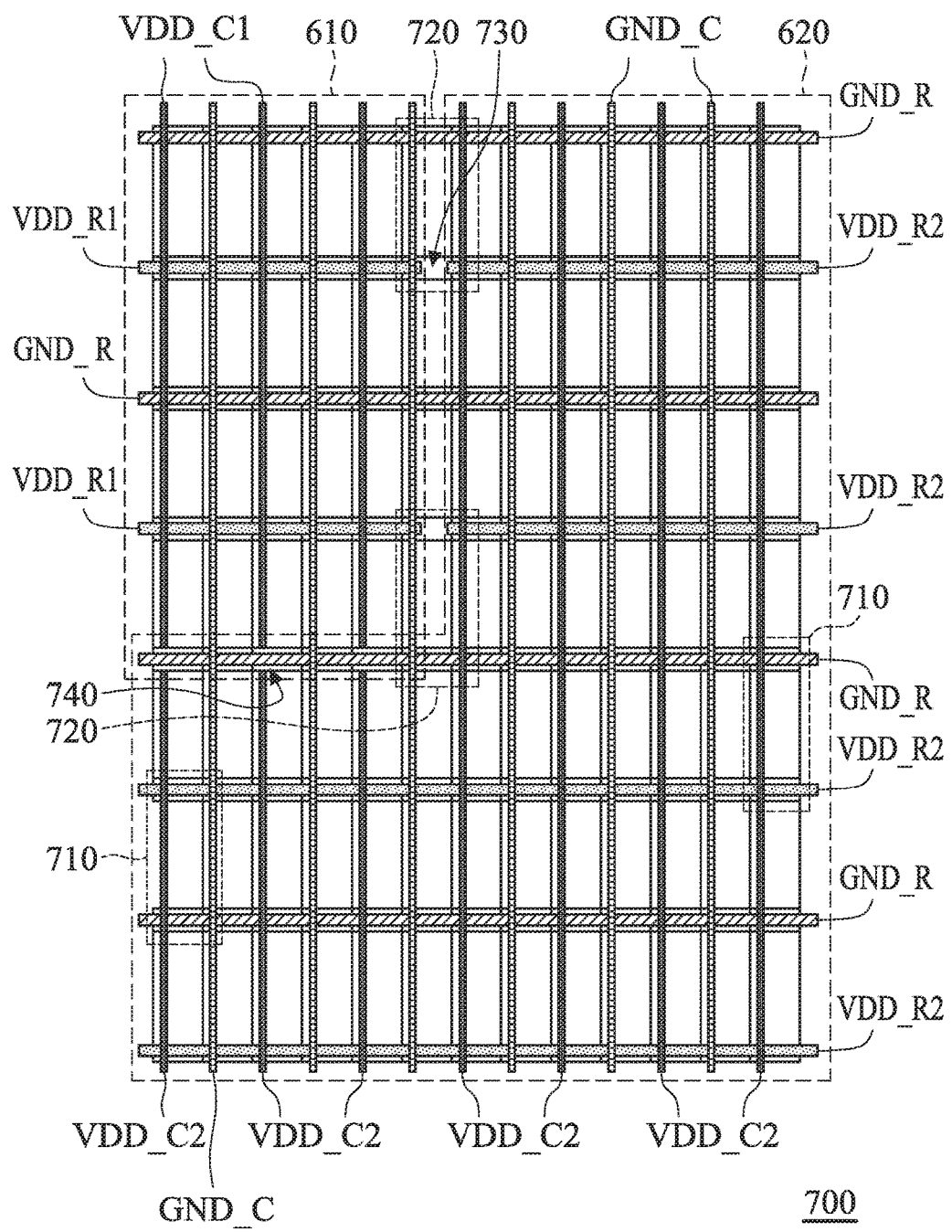
FIG. 7 shows a zoom-in diagram of the macro block of FIG. 6 according to an embodiment of the invention.

FIG. 7 shows a zoom-in diagram 700 of the macro block 600 of FIG. 6 according to an embodiment of the invention. The zoom-in diagram 700 shows a boundary between the partitions 610 and 620 of FIG. 6. In the embodiment, each of the partitions 610 and 620 comprises a plurality of standard cells 710 formed a standard cell array, and a plurality of power lines and plurality of ground lines form a mesh disposed on the standard cell array. In the partition 610, a plurality of power lines VDD_R1 and a plurality of ground lines GND_R are alternately disposed on the rows of the mesh, and a plurality of power lines VDD_C1 and a plurality of ground lines GND_C are alternately disposed on the columns of the mesh. In the embodiment, the power lines VDD_R1 and the ground lines GND_R are implemented by a first metal layer, and the power lines VDD_C1 and the ground lines GND_C are implemented by a second metal layer below or above the first metal layer. In some embodiments, the power lines VDD_R1 and VDD_C1 and the ground lines GND_R and GND_C are implemented by different metal layers. Similarly, in the partition 620, a plurality of power lines VDD_R2 and a plurality of ground lines GND_R are alternately disposed on the rows of the mesh, and a plurality of power lines VDD_C2 and a plurality of ground lines GND_C are alternately disposed on the columns of the mesh. In the embodiment, the power lines VDD_R2 and the ground lines GND_R are implemented by the first metal layer, and the power lines VDD_C2 and the ground lines GND_C are implemented by the second metal layer. In some embodiments, the power lines VDD_R2 and VDD_C2 and the ground lines GND_R and GND_C are implemented by different metal layers. It should be noted that the shape, size and type of the standard cells are used as an example, and not to limit the invention. Furthermore, for each standard cell 710 of the partitions 610 and 620, the power lines and the ground lines completely pass across the standard cell. Moreover, the partitions 610 and 620 share the ground lines GND_R and GND_C, and the ground lines GND_R and GND_C will be connected to each other through a plurality of vias between the first and second metal layers. Referring to FIGS. 6 and 7 together, the power lines VDD_R1 and VDD_C1 are coupled to the LDO voltage regulator 615 of the partition 610. Thus, the output voltage of the LDO voltage regulator 615 is provides to the standard cells 710 of the partition 610 as a supply voltage. Similarly, the power lines VDD_R2 and VDD_C2 are coupled to the LDO voltage regulator 625 of the partition 620. Thus, the output voltage of the LDO voltage regulator 625 is provides to the standard cells 710 of the partition 620 as a supply voltage.

In FIG. 7, a plurality of power isolation cells 720 are disposed between the partitions 610 and 620. In the embodiment, only the ground lines GND_R and GND_C completely pass across the power isolation cell 720. The power isolation cell 720 is used to separate the power lines of the partitions 610 and 620, i.e. the power lines will not completely pass across the power isolation cell 710. For example, the power lines VDD_R1 and the power lines VDD_R2 disposed on the same row are separated by the power isolation cells 720, shown as label 730. In one embodiment, the power lines VDD_C1 and the power lines VDD_C2 disposed on the same column are also separated by the power isolation cells 720, shown as label 740. In some embodiments, the power isolation cell 720 is a bypass capacitor.

Figure 8:
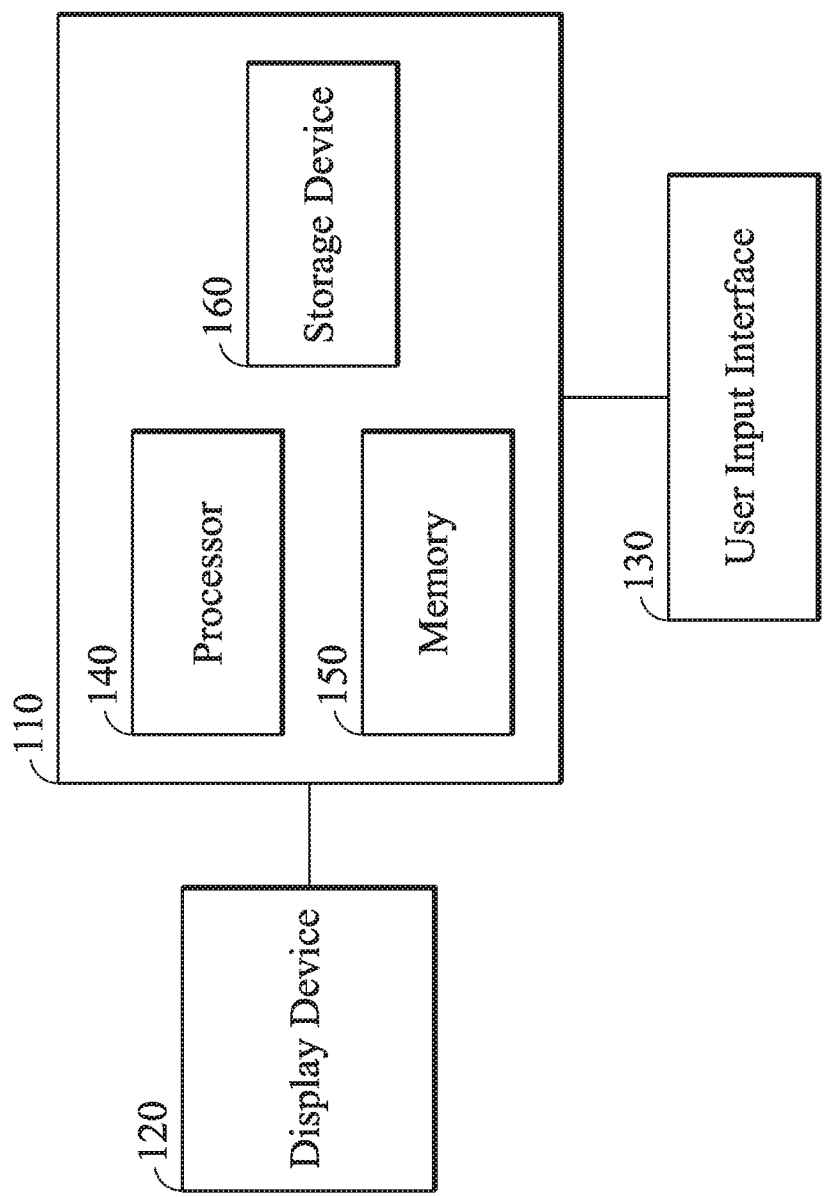
FIG. 8 shows a computer system according to an embodiment of the invention.

FIG. 8 shows a computer system 100 according to an embodiment of the invention. The computer system 100 comprises a computer 110, a display device 120 and a user input interface 130, wherein the computer 110 comprises a processor 140, a memory 150, and a storage device 160. The computer 110 is coupled to the display device 120 and the user input interface 130, wherein the computer 110 is capable of operating an electronic design automation (EDA) tool. Furthermore, the computer 110 is capable of receiving input instruction from the user input interface 130 and displaying the physical layouts and the placements of macro blocks of the IC on the display device 120. In one embodiment, the display device 120 is a GUI for the computer 110. Furthermore, the display device 120 and the user input interface 130 can be implemented in the computer 110. The user input interface 130 may be a keyboard, a mouse and so on. In the computer 110, the storage device 160 can store the operating systems (OSs), applications, and data that comprise input required by the applications and/or output generated by applications. The processor 140 of the computer 110 can perform one or more operations (either automatically or with user input) in any method that is implicitly or explicitly described in this disclosure. For example, during operation, the processor 140 can load the applications of the storage device 160 into the memory 150, and then the applications can be used by a user to create, view, and/or edit a placement, a floor plan and a physical layout for a circuit design.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for distributing power in a layout of an integrated circuit, wherein the integrated circuit comprises at least one macro block, comprising:
    obtaining a first physical layout of the macro block, wherein the macro block comprises a plurality of standard cells;
    dividing the first physical layout into a plurality of partitions according to an IR (current-resistance) simulation result of the first physical layout;
    inserting a plurality of power isolation cells between the partitions;
    obtaining a second physical layout according to the partitions and the power isolation cells;
    obtaining a macro placement of the macro block according to the second physical layout, and
    fabricating the integrated circuit according to the macro placement
    wherein each of the partitions further comprises a low drop out (LDO) regulator.

2. The method as claimed in claim 1, further comprising:
    inserting the LDO voltage regulators into the respective partitions according to the IR simulation result,
    wherein an output property of the LDO voltage regulator is determined according to the IR simulation result regarding the corresponding partition.

3. The method as claimed in claim 1, wherein each of the LDO voltage regulators provides an output voltage as a supply voltage of the standard cells of the corresponding partition.

4. The method as claimed in claim 3, wherein each of the LDO voltage regulators provides the output voltage according to the same power voltage.

5. The method as claimed in claim 3, wherein the step of inserting the power isolation cells between the partitions further comprises:
    arranging the power isolation cells at a boundary between a first partition and a second partition among the partitions,
    wherein the first partition is directly adjacent to the second partition,
    wherein the supply voltage of the standard cells of the first partition and the supply voltage of the standard cells of the second partition are separated by the power isolation cells.

6. The method as claimed in claim 5, wherein a quantity of the standard cells of the first partition is equal to a quantity of the standard cells of the second partition.

7. The method as claimed in claim 5, wherein a layout size of the first partition is different from a layout size of the second partition.

8. The method as claimed in claim 5, wherein a layout area of the first partition and a layout area of the second partition have the same shape.

9. A method for distributing power in a layout of an integrated circuit, wherein the integrated circuit comprises at least one macro block, the method comprising:
    obtaining a first physical layout of the macro block, wherein the macro block comprises a plurality of standard cells;
    obtaining an IR (current-resistance) simulation result of the first physical layout;
    dividing the first physical layout into a plurality of partitions according to the IR simulation result;
    inserting a plurality of low drop out (LDO) regulators into the partitions, respectively;
    obtaining a second physical layout according to the partitions and the LDO voltage regulators,
    obtaining a macro placement of the macro block according to the second physical layout, and
    fabricating the integrated circuit according to the macro placement
    wherein each of the LDO voltage regulators provides an output voltage as a supply voltage of the standard cells of the corresponding partition, and the supply voltage of the standard cells of each of the partitions is independent.

10. The method as claimed in claim 9, wherein the step of inserting the LDO voltage regulators into the partitions, respectively, further comprises:
    inserting the LDO voltage regulators into the corresponding partitions according to the IR simulation result, respectively,
    wherein a property of the output voltage of each of the LDO voltage regulators is determined according to the IR simulation result regarding the corresponding partition.

11. The method as claimed in claim 10, wherein each of the LDO voltage regulators provides the output voltage according to the same power voltage.

12. The method as claimed in claim 9, further comprising:
    inserting a plurality of power isolation cells between the partitions.

13. The method as claimed in claim 12, wherein the step of inserting the power isolation cells between the partitions further comprises:
    arranging the power isolation cells at a boundary between a first partition and a second partition among the partitions,
    wherein the first partition is directly adjacent to the second partition,
    wherein the supply voltage of the standard cells of the first partition and the supply voltage of the standard cells of the second partition are separated by the power isolation cells.

14. The method as claimed in claim 13, wherein a quantity of the standard cells of the first partition is equal to a quantity of the standard cells of the second partition.

15. The method as claimed in claim 13, wherein a layout size of the first partition is different from a layout size of the second partition.

16. The method as claimed in claim 13, wherein a layout area of the first partition and a layout area of the second partition have the same shape.

17. An integrated circuit, comprising:
- at least one macro block, comprising a plurality of standard cells formed a physical layout,
- wherein the physical layout is divided into a plurality of partitions according to an IR (current-resistance) simulation result of the macro block,
- wherein each of the partitions further comprises a low drop out (LDO) regulator,
- wherein each of the LDO voltage regulators provides an output voltage as a supply voltage of the standard cells of the corresponding partition, and the output voltage of each of the LDO voltage regulators is independent.

18. The integrated circuit as claimed in claim 17, wherein the macro block is a processor, a memory or a specific circuit.

19. The integrated circuit as claimed in claim 17, wherein each of the LDO voltage regulators provides the output voltage according to the same power voltage.

20. The integrated circuit as claimed in claim 17, wherein the macro block further comprises a plurality of power isolation cells disposed between the adjacent partitions.

21. The integrated circuit as claimed in claim 20, wherein the supply voltages of the standard cells of the adjacent partitions are separated by the power isolation cells.

22. The integrated circuit as claimed in claim 17, wherein quantities of the standard cells of the partitions are the same.

23. The integrated circuit as claimed in claim 17, wherein layout sizes of the partitions are different.

24. The integrated circuit as claimed in claim 17, wherein layout areas of the partitions have the same shape.

* * * * *